G. C. BALBACH.
FURNITURE JOINT.
APPLICATION FILED MAR. 17, 1914.
1,214,261.
Patented Jan. 30, 1917.
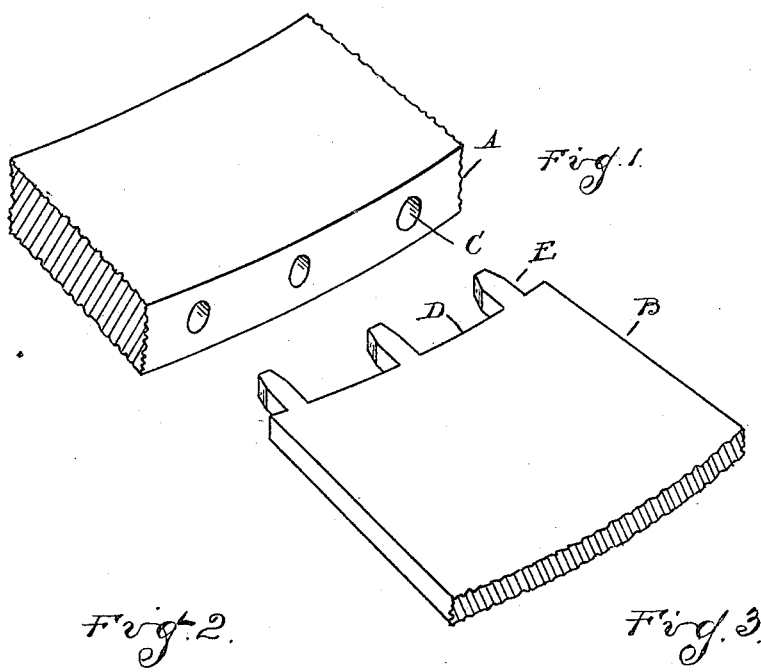
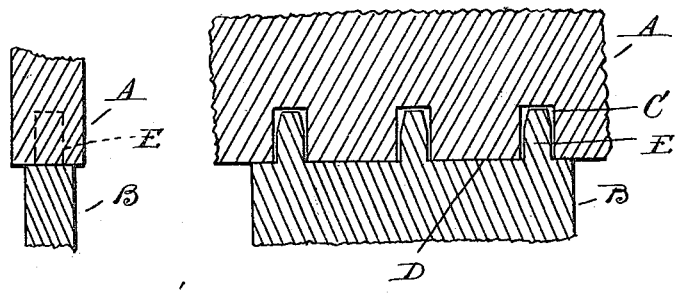
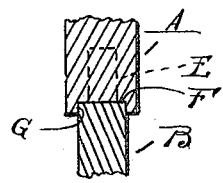
WITNESSES:
W. K. Ford
James P. Barry
INVENTOR
Gustav C. Balbach
BY
Whittemore Hulbert & Whittemore
ATTORNEY

UNITED STATES PATENT OFFICE.

GUSTAV C. BALBACH, OF DETROIT, MICHIGAN, ASSIGNOR TO MURPHY CHAIR COMPANY, OF DETROIT, MICHIGAN, A CORPORATION OF MICHIGAN.

FURNITURE-JOINT.

1,214,261.      Specification of Letters Patent.      Patented Jan. 30, 1917.

Application filed March 17, 1914. Serial No. 825,388.

*To all whom it may concern:*

Be it known that I, GUSTAV C. BALBACH, a citizen of the United States of America, residing at Detroit, in the county of Wayne and State of Michigan, have invented certain new and useful Improvements in Furniture-Joints, of which the following is a specification, reference being had therein to the accompanying drawings.

In the manufacture of chairs and other articles of furniture a common method of joining transversely-arranged members is by a mortise and tenon joint. For instance, in a chair back the vertically-extending banister is usually mortised into the top slat and bottom rails, and as the stock used is comparatively thin the walls of the mortised member have little strength. As a consequence the banisters are frequently broken out. The weakness of the structure is due to the fact that the mortise extends longitudinally of the grain of the wood while the pressure upon the banister is usually transverse thereto. Thus there is a shearing stress placed upon the tenon member parallel to the grain thereof and the material has little strength to resist such a stress. With the present construction I have avoided this weakness by substituting for the continuous slot or mortise a plurality of comparatively small bores and have substituted for the continuous tenon an interrupted tenon or series of small tenons. The uncut stock between the bores greatly strengthens the structure, while the reduction in size of the tenons is not objectionable, and the stress to which they are subjected is transverse instead of parallel to the grain.

My improvement may be applied to various articles of furniture, but, as specifically shown in the drawings, it is applied to a joint between the banister and top slat of a chair.

Figure 1 is a perspective view of a portion of these elements detached; Fig. 2 is a cross section showing the elements in engagement and in a slightly modified construction; Fig. 3 is a longitudinal section thereof; and Fig. 4 is a view similar to Fig. 2 showing a slight modification.

A is the top slat of the chair back and B is the vertically-extending banister member.

C are bores formed in the edge of the member A and spaced to leave uncut portions D therebetween.

E are interrupted tenons formed at the end of the member B so as to register with the bores C. The two members A and B may be placed together by inserting the interrupted tenons E in the bores C and where pressed in full engagement the joint is indistinguishable from the ordinary mortise and tenon joint. The strength of the structure is, however, very greatly increased.

For certain uses it may be desirable to form in the member A a very shallow continuous mortise F, with the bores C formed in the bottom of the mortise. This will form a slight shoulder G for sealing the joint between the abutting end of the member B and the member A, but the stress is not exerted against this shoulder but against the tenons E.

The construction as above described is one that can be easily manufactured, as the recesses C are formed by boring instead of by cutting, to a contour complementary to that of the interrupted tenons. On the other hand, the strength of the structure is not impaired by reason of the use of round bores in place of the square recesses. It is preferred to form the tenons of square cross-section as illustrated.

What I claim as my invention is:—

A furniture joint, comprising two transversely-extending members of unequal thickness, and a series of tenons of substantially square cross-section projecting from one end of the thinner member, and having the full thickness of said member, an edge of the other member being formed with a series of round bores registering with said tenons to receive the same.

In testimony whereof I affix my signature in presence of two witnesses.

GUSTAV C. BALBACH.

Witnesses:
     G. McQUIGG,
     J. M. RHODES.

Copies of this patent may be obtained for five cents each, by addressing the "Commissioner of Patents, Washington, D. C."